United States Patent

Karbasi

[11] Patent Number: 6,043,324
[45] Date of Patent: Mar. 28, 2000

[54] PROCESS AND CATALYST COMPONENT FOR HOMO- AND COPOLYMERIZATION OF OLEFINS

[75] Inventor: Amir K. Karbasi, Espoo, Finland

[73] Assignee: Borealis A/S, Denmark

[21] Appl. No.: 08/930,131

[22] PCT Filed: May 6, 1996

[86] PCT No.: PCT/FI96/00250

§ 371 Date: Apr. 1, 1998

§ 102(e) Date: Apr. 1, 1998

[87] PCT Pub. No.: WO96/34899

PCT Pub. Date: Nov. 7, 1996

[30] Foreign Application Priority Data

May 5, 1995 [FI] Finland .................................. 952175

[51] Int. Cl.⁷ .............................. C08F 4/654; C08F 10/00
[52] U.S. Cl. .................................. 526/125.3; 526/124.2; 526/124.9; 526/351; 526/905; 526/907; 525/268
[58] Field of Search .............................. 526/125.3, 124.2, 526/124.9, 905, 907; 525/268

[56] References Cited

U.S. PATENT DOCUMENTS

| | | | |
|---|---|---|---|
| 4,376,062 | 3/1983 | Hamer et al. | 526/124.6 |
| 5,075,396 | 12/1991 | Kashiwa et al. | 526/125.3 |
| 5,438,110 | 8/1995 | Ishimaru et al. | 526/125.3 |

FOREIGN PATENT DOCUMENTS

| | | |
|---|---|---|
| 0517183 A2 | 12/1992 | European Pat. Off. . |
| 0588277 A2 | 3/1994 | European Pat. Off. . |
| 0 357 135 A3 | 3/1990 | Finland . |
| 0 376 559 A1 | 7/1990 | Finland . |

OTHER PUBLICATIONS

Publication World Polyolefin Industry (1982–83), vol. 2, pp. XIV–83 to XIV–91.

*Primary Examiner*—Fred Teskin
*Attorney, Agent, or Firm*—Medlen & Carroll, LLP

[57] ABSTRACT

The present invention provides methods for the homopolymerization and/or copolymerization of olefins. In preferred methods of the invention the polymerizable olefins have the general formula of $CH_2=CR_1R_2$, wherein $R_1$ and $R_2$ are the same or different, and are hydrogen or a $C_1-C_{10}$ alkyl. In particularly preferred embodiments, the methods further comprise contacting the polymerizable olefin with a procatalyst and a co-catalyst. In other embodiments, the methods further involve the use of an electron donor.

33 Claims, 1 Drawing Sheet

PROCESS AND CATALYST COMPONENT FOR HOMO- AND COPOLYMERIZATION OF OLEFINS

The invention relates to a process for the homo- or copolymerization of olefins by contacting one or more polymerizable olefins having the general formula $$CH_2=CR_1R_2 \qquad (I)$$

where $R_1$ and $R_2$ are the same or different and are hydrogen or a $C_1$–$C_{10}$ alkyl, with a polymerization catalyst system obtained by contacting at least the following components:

1) a solid procatalyst which contains titanium (Ti), chlorine and magnesium,
2) a cocatalyst which contains aluminum (Al) and a $C_1$–$C_{10}$ alkyl, and possibly
3) an external electron donor (ED).

The invention also relates to a catalyst component intended for the polymerization of one or several olefins having the general formula $$CH_2=CR_1R_2 \qquad (I)$$

where $R_1$ and $R_2$ are the same or different and are hydrogen or a $C_1$–$C_{10}$ alkyl and which has been prepared by contacting at least the following components:

1) a solid procatalyst which contains titanium (Ti), chlorine and magnesium,
2) a cocatalyst which contains aluminum (Al) and a $C_1$–$C_{10}$ alkyl, and possibly
3) an external electron donor (ED).

The invention also relates to the use of a catalyst component of the above type for the polymerization of one or more olefins according to Formula (I) given above.

Olefins are commonly polymerized using a Ziegler-Natta catalyst system which comprises a so-called procatalyst and a so-called cocatalyst. The procatalyst is in the catalyst system that component which is based on a compound of a transition metal belonging any of Groups 4–10 of the Periodic Table of the Elements (IUPAC 1990), such as titanium, vanadium, chromium or zirconium. A typical procatalyst is made up of a titanium halide compound supported on a magnesium halide. The cocatalyst for its part is in the catalyst system that component which is based on an organometallic compound of a metal belonging to any of groups 1–3 and 13 of the Periodic Table of the Elements (IUPAC 1990), such as a metal hydride or a metal alkyl. A typical cocatalyst is an alkylaluminum compound. As is known, in addition to a procatalyst (including the support) and a cocatalyst, the catalyst system usually also includes agents which enhance and modify the catalytic properties, such as electron donor compounds and other auxiliaries. The function of the electron donors is to control the stereospecificity of the polymer and, when necessary, to improve the activity of the catalyst system. A large number of electron donors are known in the art, and they include ethers, esters and polysilanes or siloxanes.

It is also known that the activity and stereospecificity of the catalyst system, as well as the other properties of the polymer formed, such as its morphology and bulk density, can be affected by contacting the procatalyst and the cocatalyst, and any electron donors and other additives, before the catalyst system is used for the polymerization of an olefin or olefins. In such a case the said components of the catalyst system have been contacted outside the polymerization reaction zone and been subsequently fed into the polymerization zone and contacted therein with the olefin(s) in polymerization conditions.

It is also known that such contacting before polymerization can be carried out either before the so-called prepolymerization, or after it. In prepolymerization the particles of the catalyst system are surrounded with a small amount of polymer before they are fed into the actual polymerization zone.

Publication EP-588 277 A2 discloses a precontacting process in which a procatalyst prepolymerized by using a small amount of a monomer and a cocatalyst is contacted with a cocatalyst and an external electron donor before being introduced into the polymerization reaction zone. In this publication it is stated that the pretreated procatalyst is contacted with the cocatalyst as the procatalyst is being fed into a dilute stream of cocatalyst; this stream carries the procatalyst into the polymerization zone. According to this publication, the preferred concentration of cocatalyst in the stream is within a range of 10–30% by weight. The publication further teaches that the more cocatalyst is contacted with the procatalyst before the stream of procatalyst and cocatalyst enters the polymer reaction zone, the higher is the efficiency of the catalyst (cf. page 5, lines 8–13, of said publication).

Publication EP-517 183 A2 discloses the activation of procatalyst in olefin polymerizations in a gas phase reactor. According to this publication, all of the procatalyst, cocatalyst and external electron donor is introduced into the precontacting vessel, in which the activation of the procatalyst is carried out and an active catalyst system is obtained. In this process, an n-hexane solution of triethyl aluminum (TEA) and cyclohexyl methyl dimethoxy silane, the latter serving as the external donor, are added into the precontacting vessel in an amount such that the molar ratio of TEA/Ti is greater than 1 and usually within a range of 20–800 (cf. page 6, line 39, of said publication). The molar ratio TEA/Ti used in the examples was 120 (cf. page 7, line 52, of said publication). Publication World Polyolefin Industry, 1982–83, Volume 2, pages XIV-83–XIV-91, describes the Montedison process (Himont Inc.). According to this publication, a catalyst system comprising a titanium-containing supported procatalyst, an aluminum-alkyl compound and an electron is first mixed and is then introduced into the reactor.

In the publications referred to above, certain advantages were achieved by mixing the components of a Ziegler-Natta catalyst system together before the polymerization, but the activity of the catalyst and the purity of the polymer obtained were not sufficiently high. The stereospecificity of the catalyst system also left room for improvement. Furthermore, the morphology of the polymers produced by using the catalyst system left room for improvement; for example, they contained too high a proportion of fines.

The object of the present invention is to provide an olefin polymerization process and a catalyst component which is usable in the olefin polymerization process and produces a maximal amount of polyolefin. A further object is a maximally pure polyolefin, i.e. a polyolefin having a minimal ash content. The ash mostly consists of inorganic catalyst residue remaining in the polyolefin. The invention also aims at a maximally high stereospecificity when what is in question is the polymerization of olefins containing at least 3 carbon atoms. The invention also aims at as good a polyolefin morphology as possible, i.e. a preferred form, size, and size distribution of the formed polyolefin particles. A particular aim in this case is the minimization of the amount of fines in the polyolefin product.

The problems mentioned above have now been solved, and the objects set have been achieved, by using a new process for the homo- or copolymerization of olefins, the process being in the main characterized in what is stated in steps a)–c) of claim 1. It has thus been realized that the homo- or copolymerization of olefins is more efficient and more stereo-specific than before and produces purer polyolefin if it comprises steps wherein a) in the absence of polymerizable olefin, a first amount of cocatalyst and at least one-half of the total amount of procatalyst are contacted so that the molar ratio Al/Ti is within a range of 0.1–20, in order to obtain a precontact product;

b) the precontact product, a second amount of cocatalyst, and one or more polymerizable olefins according to Formula (I) presented above are contacted in order to produce a first homo- or copolymerization product, or alternatively a prepolymerization product;

c) alternatively, the prepolymerization product, a third amount of cocatalyst, and one or several polymerizable olefins according to Formula (I) presented above are contacted in order to produce a second homo- or copolymerization product; and d) the first homo- or copolymerization product, the prepolymerization product or the second homo- or copolymerization product is recovered.

It has thus been realized that by contacting only a portion of the cocatalyst with the procatalyst and by introducing the so-called precontact product thus obtained into the polymerization zone together with the rest of the cocatalyst, much better polymerization results can be achieved than by carrying out a conventional precontacting by using the entire amount of procatalyst and cocatalyst. Such partial precontacting has proven to be fully superior in terms of the productivity of the polymerization process and the quality of the obtained polymer, i.e. its low content of ashes and fines.

In the olefin polymerization process according to the invention it is possible to add procatalysts and cocatalysts of different types to the different steps. It is, however, preferable to use only one type of procatalyst and/or only one type of cocatalyst. It is especially preferable to introduce the entire procatalyst amount of the process into the precontacting step a), where it is, in the manner described above, contacted with the cocatalyst so that the molar ratio Al/Ti is within a range of 0.1–20.

In the process according to the invention, the cocatalyst to be fed into the polymerization zone is divided into at least two portions. The first portion, i.e. the first amount of cocatalyst, is mixed, in the absence of polymerizable olefin, with at least one-half of the total amount of procatalyst and preferably with the total amount of procatalyst. The mixing is preferably carried out in a so-called precontacting zone. As was stated, in the precontacting step a) the cocatalyst amount must be controlled so that the molar ratio Al/Ti is within a range of 0.1–20. It should be pointed out in this connection that this range is to be interpreted as being outside the range defined in publication EP-517 183 A2 (p. 6, line 39). A preferable molar ratio Al/Ti is, however, within a range of 0.5–16, and an even more preferable molar ratio within a range of 1.0–8.0, and the most preferable molar ratio within a range of approx. 1.5–5.0.

From the fact that more and better polyolefin is obtained if a small amount of cocatalyst is mixed with the procatalyst before the polymerization it follows that it is also advantageous to add cocatalyst in the form of a dilute solution to the procatalyst. The cocatalyst concentration in such a solution is preferably within a range of 0.001–2.0 mol/dm$^3$, more preferably within a range of 0.001–1.0 mol/dm$^3$, and most preferably within a range of 0.05–0.5 mol/dm$^3$. In principle, the entire cocatalyst amount could be contacted with the procatalyst by using such a dilute solution, but in practice this is impossible owing to the problems of handling large amounts of diluent; thus only part of the cocatalyst should be used.

It has thus been discovered that excellent catalytic activity and excellent polyolefin quality are achieved when only part of the cocatalyst needed is contacted in the precontacting step a) with the procatalyst. The first cocatalyst amount, used in step a) of the process, preferably constitutes 0.1–30% by weight, more preferably 0.5–10% by weight, and most preferably 1.0–5.0% by weight of the total amount of cocatalyst used in the process. As was mentioned, the rest of the cocatalyst needed is introduced after step a) into one or more pre-, homo- or copolymerization steps b) and c).

In the process according to the present invention it is preferable to use an external electron donor (ED) together with a cocatalyst in the various steps of the process. According to this embodiment, in step a) a first amount of cocatalyst, at least one half of the total amount of procatalyst, and a first amount of external electron donor (ED) are contacted in the absence of polymerizable olefin, preferably so that the molar ratio Al/ED is within a range of 0.5–100, in order to obtain a precontact product. In step b) this precontact product, a second amount of cocatalyst, a second amount of external electron donor (ED), and one or more polymerizable olefins are contacted in order to obtain a first homo- or copolymerization product or, alternatively, a prepolymerization product. In case a prepolymerization product is prepared, i.e. prepolymerization is carried out using the catalyst system, it is possible in step c) to contact the prepolymerization product, a third amount of cocatalyst, a third amount of external electron donor (ED), and one or more polymerizable olefins according to Formula (I) in order to produce a second homo- or copolymerization product. Finally the first homo- or copolymerization product, the prepolymerization product or the second homo- or copolymerization product is recovered in step d).

It is advantageous if in step a) the first amount of cocatalyst, at least one-half of the total amount of procatalyst, and the first amount of external electron donor (ED) are contacted in such amounts that the molar ratio Al/ED is within a range of 1.0–50, preferably 1.0–20.

As was stated above in connection with the adding of the first cocatalyst amount, it is preferable to add it in the form of a dilute solution. In that embodiment of the invention in which external electron donor (ED) is added to the precontacting step a) together with cocatalyst, it is preferable to add it in the form of a dilute solution having an electron donor concentration within a range of 0.0002–0.4 mol/dm$^3$, more preferably 0.0002–0.2 mol/dm$^3$, and most preferably 0.01–0.1 mol/dm$^3$. It is also preferable to introduce the electron donor and the cocatalyst in the same solution.

It has thus been observed in the present invention that the yield of the olefin polymerization catalyst system and the quality of the polyolefin prepared using it are improved if the procatalyst is precontacted with a small amount of cocatalyst, possibly together with an external electron donor. Since the quality of the polyolefin is improved specifically so that the amount of fines present in it is crucially reduced, it can be concluded that by the precontacting according to the invention, by using a small amount of cocatalyst, it is possible to avoid the fragmentation of catalyst particles into fines, which is then repeated in the polymer product. By maintaining in the precontacting step a) the amounts and concentrations of the cocatalyst and the external electron donor, if any, at low values, the formation of detrimental fines in the catalyst and in the polyolefin product can thus be avoided.

A low cocatalyst amount in the precontacting step a) also increases the activity of the catalyst system in the polymerization of olefins. The reason for this is not known with certainty, but it is known that the cocatalyst tends to reduce the transition metal of the transition metal component, whereupon large amounts may excessively reduce the transition metal to a non-active form. On the other hand, small amounts and concentrations of cocatalyst perform the reducing more delicately, in which case a larger proportion of the transition metal is activated.

The rule that lower concentrations are used at higher molar ratios Al/Ti applies also in general to the Al/Ti molar ratios presented above for the precontacting step a) and to the cocatalyst concentrations stated. The use of very low concentrations is, however, limited by the technical problems caused by the use of large amounts of diluent (see above).

The precontacting step a) using an incomplete amount of cocatalyst can be carried out in any suitable vessel equipped with mixing, but also in a pipe system or a static mixer. The structure of the mixer is not critical in terms of the precontacting step a). The temperature is also not critical, although preferably it is between −50° C. and +100° C., more preferably between −20° C. and +50° C., and most preferably between −5° C. and +30° C. As was already pointed out, in the precontacting step a) preferably a solution of cocatalyst and possibly of donor is used, in which case, according to one embodiment, the solvent used is a $C_6$–$C_{12}$ hydrocarbon preferably having a density of 0.6–0.9 g/cm$^3$, such as n-heptane. The contact period in the precontacting step is also not critical, and according to one embodiment it is within a range of 10 s–5 h, preferably within a range of 10 min–2 h.

Both a pure procatalyst and a procatalyst which has been coated with a prepolymer by prepolymerization can be used in step a). However, it is most preferable to use a procatalyst which is a procatalyst not coated with prepolymer, since in such a case the attenuating effect of a small cocatalyst amount on the contacting reaction will be high, and a cumbersome and expensive prepolymerization treatment is not needed, i.e. a partial precontacting replaces prepolymerization.

The present process for the homo- or copolymerization of olefins comprises, in addition to the precontacting step a) mentioned above, also at least one polymerization step. The precontacting step a) is followed by a polymerization step b), in which the product of the precontacting step, a second amount of cocatalyst, and one or more polymerizable olefins according to Formula (I) are contacted in order to produce a first homo- or copolymerization product or, alternatively, a prepolymerization product. The polymerization step b) following the precontacting step a) may thus lead either to a first completed homo- or copolymerization product or alternatively to a prepolymerization product. However, these alternatives have in common the fact that, owing to the precontacting step, polymerization is more ample and yields polyolefin of a better quality.

If prepolymerization product, i.e. a procatalyst coated with a small amount of polymer, is prepared in the polymerization step b) following the precontacting step, this coated procatalyst may, in a second, subsequent polymerization step c) be contacted with a third amount of cocatalyst, with one or more polymerizable olefins according to Formula (I) and possibly with a third amount of external electron donor to produce a second homo- or copolymerization product. In these polymerization steps b) or c) it is possible to use a molar ratio Al/Ti which is normal in the polymerization of olefins by using a catalyst system which contains titanium and aluminum. By the molar ratio Al/Ti is in this case meant the total molar ratio, i.e. the amounts introduced in steps a), b) and possibly c) are included in the calculation of the aluminum and titanium amounts. A typical total molar ratio Al/Ti is within a range of approx. 50–1500.

As was stated above, in the olefin polymerization process according to the invention it is possible to use one or more polymerizable olefins having the general formula $$CH_2=CR_1R_2 \qquad (I)$$

where $R_1$ and $R_2$ are the same or different and are hydrogen or a $C_1$–$C_{10}$ alkyl. Such olefins include ethylene, propylene, 1-butene, isobutene and 4-methyl-1-pentene. Some examples of usable higher olefins are 1-pentene, 3-methyl-1-butene, 4-methyl-1-hexene, 5-methyl-1-hexene, 5-methyl-1-heptene, vinyl-cyclohexane, and 1-decene. When copolymerization is involved, the process according to the invention concerns both the mutual copolymerization of the said olefins and their copolymerization with other monomers which are capable of being polymerized by using a Ziegler-Natta catalyst system of the type in question. It is also to be borne in mind that, if several polymerization steps (b) and c)) are used, different monomers can be used in different steps. In the production of certain polyethylene types, it has proved useful to employ propylene for prepolymerization.

It is possible, when necessary, to introduce hydrogen, $H_2$, to the polymerization step in order to control the molar mass of the homo-, co- and/or prepolymerization product.

As was pointed out above, in the process according to the invention for the homo- or copolymerization of olefins, a polymerizable olefin according to general formula (I) is contacted with a polymerization catalyst system which has been obtained by causing a procatalyst which contains titanium, chlorine and magnesium to react with a cocatalyst and possibly an external electron donor. The procatalyst which contains titanium, chlorine and magnesium preferably comprises a titanium compound which contains at least one titanium-halide bond, the compound being supported on an active magnesium compound. The titanium compound which contains a titanium-halide bond may be titanium tetrachloride, $TiCl_4$, or titanium trichloride, $TiCl_3$, preferably titanium tetrachloride, $TiCi_4$. The magnesium compound may be, for example, magnesium dichloride, $MgCl_2$, magnesium alkyl $MgR_2$ or magnesium alkoxide $Mg(OR)_2$ where R is an alkyl. An especially preferable solid procatalyst usable in the process according to the invention comprises a titanium compound which contains at least one titanium-halide bond, the compound being supported on an active magnesium halide, preferably a reaction product of $TiCl_4$ and a $MgCl_2$ support.

The polymerization catalyst system used in the process according to the invention is thus obtained by contacting a solid procatalyst with a cocatalyst which contains aluminum and a $C_1$–$C_{10}$ alkyl, and possibly with an electron donor. The cocatalyst which contains aluminum and a $C_1$–$C_{10}$ alkyl is in this case preferably either tri-$C_1$–$C_{10}$-alkylaluminum, a di-$C_1$–$C_{10}$-alkylaluminum halide, a mono-$C_1$–$C_{10}$-alkylaluminum dihalide, or any $C_1$–$C_{10}$-alkylaluminum sesquihalide. When alkylaluminum halides are used, chlorine is a preferred halide. However, the most preferable cocatalyst for use in the process according to the invention is tri-$C_1$–$C_{10}$-alkylaluminum, such as triethylaluminum (TEA). It should be pointed out that the cocatalyst may also be a mixture or reaction product of several compounds of the type mentioned above, containing alkyl and aluminum.

According to one embodiment of the invention, a polymerization catalyst system which has been obtained by contacting a solid procatalyst, a cocatalyst and an external electron donor is used in the polymerization process. As was pointed out above, it is possible to use different types of procatalysts, cocatalysts and external electron donors in the various steps a)–c) of the process according to the invention. It is, however, preferable to use the same types of procatalyst, cocatalyst and electron donor in all steps a)–c) of the process.

By the external electron donor used in the invention is meant both conventional electron donors and so-called Lewis bases. The purpose of the external electron donors thus defined is to maintain or increase the stereospecificity of the catalyst system, and in some cases to increase the activity of the catalyst system. Electron donors usable in the process according to the invention include amines, amides, ethers, esters, ketones, nitrites, phosphines, stibines, arsines, phosporamides, thioethers, thioesters, aldehydes, alcoholates, amides, salts of organic acids, polysilanes, and siloxanes. Some examples of preferred external electron donors to be mentioned are esters of carboxylic, alkoxy or amino acids, and esters of aromatic acids. Some examples to be mentioned of usable ethers include di-lower alkoxy alkanes, such as 2-ethyl-1,1-dimethoxyhexane (EDMH). Preferred external electron donors also include organic silicon compounds (silanes), such as diphenyldimethoxy silane (DPDMS), cyclohexylmethyldimethoxysilane (CHMMS), dicyclopentyldimethoxysilane (DCPDMS) and methyl-t-butyldimethoxysilane (MTBDMS).

The components used in the process according to the invention, i.e. the solid procatalyst, the first, second and possibly third amounts of cocatalyst, the first, second and possibly third amounts of a possible external electron donor, the amount of one or more polymerizable olefins according to the general Formula (I), and the amount of hydrogen can be contacted in any order within the framework of the steps a)–c) described above, except that in general the external donor is not contacted with the solid procatalyst before it is contacted with the cocatalyst. It has namely been observed that, alone, the external donor tends to poison the solid procatalyst. Thus, with respect to the order in which the material components are added, the procedure in the invention may be, for example, as follows:

1. The cocatalyst and the external donor are mixed together, the mixture is divided into two portions, one of which is precontacted with the solid procatalyst, and the obtained mixture is fed into the polymerization zone, and the other portion is fed directly into the polymerization zone, into which there is also fed the olefin, and possibly hydrogen.
2. A portion of the cocatalyst is mixed with an internal donor, and the obtained mixture is divided into two portions, one of which is mixed with the solid procatalyst, and the thus obtained second mixture is fed into the polymerization zone, and the other portion is fed directly into the polymerization zone, into which there are also fed the remaining portion of the cocatalyst, the olefin, and possibly hydrogen.
3. A portion of the cocatalyst is mixed together with the external electron donor, and the obtained mixture is mixed together with the solid procatalyst, whereafter the obtained mixture is fed into the polymerization zone, into which there are fed at the same time the remaining portion of the cocatalyst, the olefin, and possibly hydrogen.
4. A portion of the cocatalyst is mixed with both external electron donor and the solid procatalyst, and this mixture is then fed into the polymerization zone. At the same time another portion of the cocatalyst is mixed with electron donor, and the obtained mixture is also fed into the polymerization zone, into which there is also fed the olefin, and possibly hydrogen.
5. A first portion of the cocatalyst is mixed with a solid procatalyst, and the obtained mixture is fed into the polymerization zone. At the same time a second portion of the cocatalyst and the electron donor are fed separately into the polymerization zone, into which there is also fed the olefin, and possibly hydrogen.
6. A first portion of the cocatalyst is mixed with the solid procatalyst, and the obtained mixture is fed into the polymerization zone. A second portion of the cocatalyst is mixed with the external electron donor and is fed directly into the polymerization zone, into which there is also fed the olefin monomer, and possibly hydrogen.
7. A portion of the cocatalyst is mixed with the external electron donor and the solid procatalyst, and the obtained mixture is fed into the polymerization zone. At the same time a second portion of the cocatalyst is fed directly into the reaction zone, into which there is also fed the olefin monomer, and possibly hydrogen.
8. A first portion of the cocatalyst is mixed with a first portion of the external electron donor and with the solid procatalyst, and the obtained mixture is fed into the polymerization zone. At the same time a second portion of the cocatalyst and a second portion of the external electron donor are fed directly into the polymerization zone, into which there is also fed the olefin monomer, and possibly hydrogen.

The above eight examples are only some of the possible combinations for adding, and it must be borne in mind that in the process according to the invention it is possible to separate from the solid procatalyst, the cocatalyst and the external electron donor one portion or several portions, which can freely be fed directly into the reaction zone.

Above, a process according to the invention for the homo- or copolymerization of olefins has been disclosed. The invention also relates to a catalyst component intended for the polymerization of one of several olefins having the general formula $$CH_2=CR_1R_2 \qquad (I)$$

where $R_1$ and $R_2$ are the same or different and are hydrogen or a $C_1$–$C_{10}$ alkyl and which has been prepared by contacting at least the following components:

1) a solid procatalyst which contains titanium (Ti), chlorine and magnesium;
2) a cocatalyst which contains aluminum (Al) and a $C_1$–$C_{10}$ alkyl; and possibly
3) an external electron donor (ED).

The catalyst component according to the invention is mainly characterized in that in its preparation, in the absence of polymerizable olefin, the cocatalyst and the procatalyst are contacted so that the molar ratio Al/Ti is within a range of 0.1–20.

As is evident from the above, the catalyst component which is an object of the invention corresponds to the precontacting product of step a) of the process according to the invention for the homo- or copolymerization of olefins. Thus any specifications, limitations and embodiments relating to the catalyst component according to the invention are substantially the same as the specifications, limitations and embodiments relating to the catalyst component, as stated in claims 3, 4, 6–12, and 16–18.

It is also to be taken into account that this scope of protection of the catalyst component according to the invention relates to the use of the catalyst component in any possible polymerization alternatives of a polymerizable olefin according to Formula (I), regardless of what is stated above in connection with the description of the process for the homo- or copolymerization of olefins.

In addition to the polymerization process and the catalyst component, the invention also relates to the use of a catalyst component according to claim 20 for the homo- or copolymerization of one or several olefins according to Formula (I). In this case, the use is mainly characterized in what is stated in steps a) and b) of claim 33. Analogously to the process according to the invention for the homo- or copolymerization of olefins, the procedure is as follows:

(α) the said catalyst component, an additional amount of cocatalyst, and one or more polymerizable olefins according to Formula (I) are contacted to produce a first homo- or copolymerization product or, alternatively, a prepolymerization product;

(β) alternatively, the prepolymerization product, a second additional amount of cocatalyst, and one or more polymerizable olefins according to Formula (I) are contacted in order to produce a second homo- or copolymerization product; and (γ) the first homo- or copolymerization product, the prepolymerization product, or the second homo- or copolymerization product is recovered.

It is thus seen that steps (α)–(γ) of the use according to the invention correspond to steps b)–d) of the homo- or copolymerization process described above. Thus the specifications, limitations and embodiments defined in claims 2, 5, 6 and 13–15 also apply to the use according to the invention.

DESCRIPTION OF THE DRAWING

The invention is described below with reference to the accompanying drawing, which shows one embodiment of the polymerization process according to the invention.

The storage containers for the external electron donor, the cocatalyst and the procatalyst are indicated respectively by numerals 1, 2 and 3. The precontacting vessel is indicated by numeral 4. The prepolymerization reactor is indicated by numeral 5.

Figure 1:
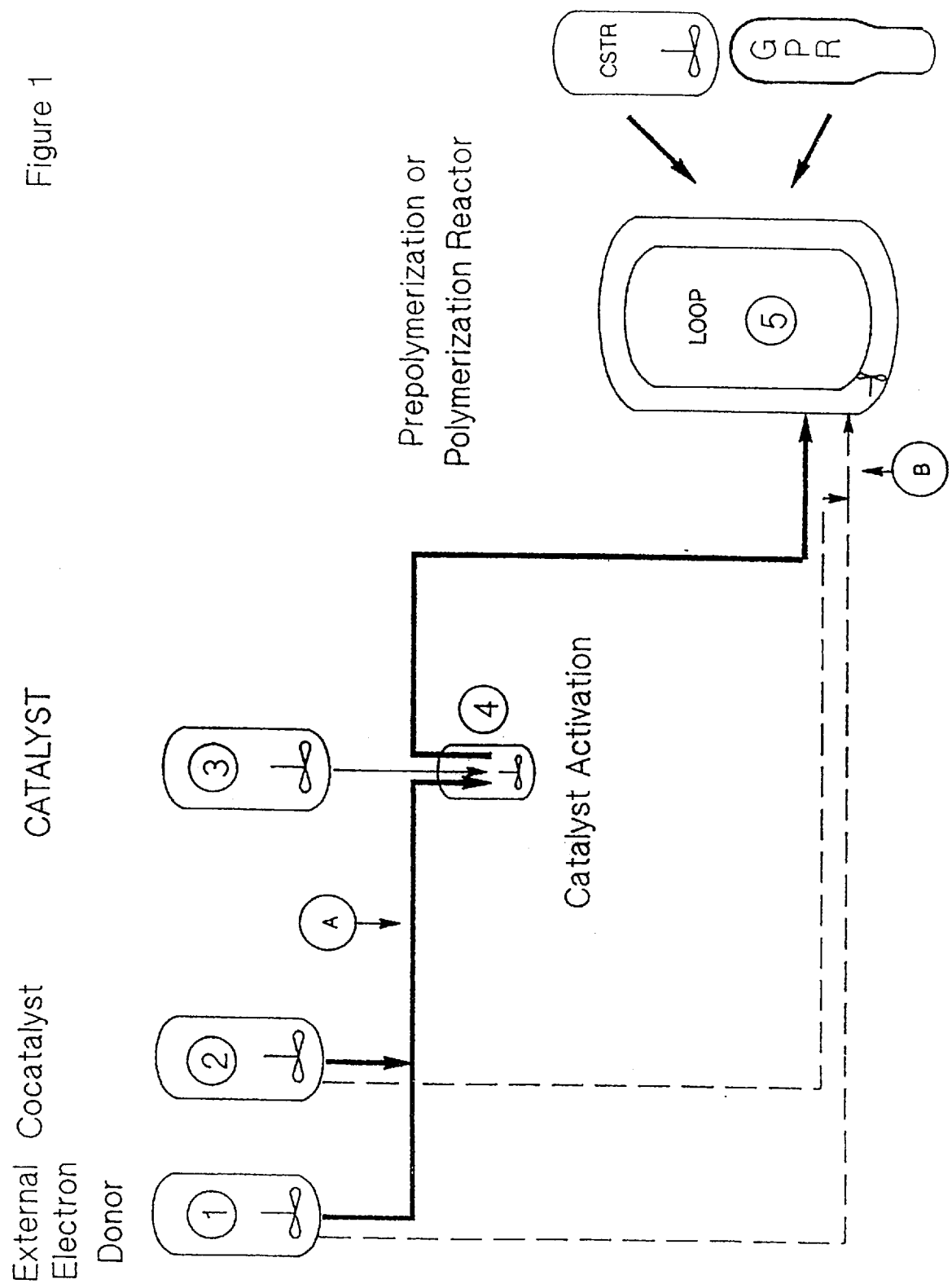

The process equipment operates as follows: The components of the cocatalyst system are introduced into the precontacting vessel 4 in the manner shown in the figure. The catalyst activated by means of precontacting is then introduced via pipe A into the prepolymerization reactor. The procatalyst, the cocatalyst and the electron donor may be introduced either in pure form or diluted with a suitable inert solvent. The procatalyst and the activated procatalyst may be added by any method, either continuously or in batches.

The amount of the cocatalyst and the external donor required for the polymerization is divided into two portions. The amount required for the precontacting is introduced via line A and the amount required directly in the prepolymerization or the polymerization is fed separately into the prepolymerization or polymerization reactor via line B. The activated catalyst component prepared by the precontacting according to the present invention can be used in slurry, solution, gas phase or solvent-free liquid phase polymerization. Furthermore, the process according to the invention can be used in continuous polymerization, in semi-batch or batch polymerization, or in polymerization requiring the prepolymerization mentioned above.

The said activation by means of precontacting can alternatively be carried out in a so-called CSTR reactor, a pipe, or a static mixer. The precontacting vessel in which the activation takes place may be pressurized or be maintained at ambient pressure.

The prepolymerization and/or polymerization zone in the process according to the invention may alternatively consist of one or more reactors. The prepolymerization or polymerization may alternatively be carried out as a batch, semi-batch or continuous gas-phase, bulk or slurry polymerization.

EXAMPLES

The cocatalyst used in the examples was triethyl aluminum (TEA). The external electron donor was cyclohexyl methyl dimethoxy silane (CHMMS) in Examples 1–3, dicyclopentyl dimethoxy silane (DCPDMS) in Examples 4–6, and 2-ethyl-1,1-dimethoxy hexane (EDMH) in Examples 7–9. The procatalyst was a high-yield $MgCl_2$-supported $TiCl_4$. The titanium content of the procatalyst was 2.4% by weight. The procatalyst was diluted in an inert heavy hydrocarbon solvent (density 0.900 $g/cm^3$ at 20° C.). The concentration of procatalyst was 175 g procatalyst/liter catalyst slurry.

The melt flow rates (abbreviated $MFR_{2.16}$, ISO 1133:1991E) of the polymer were measured at 230° C. by using a weight of 2.16 kg for the extrusion. The isotacticity indices (I.I.) were determined by n-heptane extraction.

Activation of the Procatalyst

In Examples 1, 4 and 7, the concentrations of the cocatalyst and the external electron donor were minimized, but the Al/Ti molar ratio was relatively high. This means that the cocatalyst and the external electron donor were diluted to very low concentrations. In Examples 2, 5 and 8, the concentrations of cocatalyst and external electron donor were the second lowest, while the Al/Ti molar ratio was very low.

In Comparative Examples 3, 6 and 9, both the concentrations of cocatalyst and external electron donor and the Al/Ti molar ratio were the highest.

The catalyst was activated in a different way in each example, but the final concentrations of catalyst, cocatalyst and external electron donor were the same in all examples. The polymerization conditions and the results obtained are shown in Tables 1, 2 and 3.

Polymerizations

Example 1 (comparative)

433 μl of triethyl aluminum (TEA) was mixed into 32 μl of cyclohexyl methyl dimethoxy silane (CHMMS) in 25 ml of n-heptane at room temperature. The mixture of TEA and silane was transferred into the reactor.

260 μl of TEA was mixed with 19 μl of CHMMS in 15 ml of n-heptane. Thereafter the mixture of TEA and CHMMS was introduced into a 20.2 mg portion of procatalyst. Thereafter the mixture of TEA, CHMMS and procatalyst was transferred into a 5-liter stainless steel autoclave. Precontacting was carried out at room temperature. After the precontacting step this mixture was also transferred into the reactor.

1500 g of liquefied propylene and 71 mmol of hydrogen were also added at 20° C. into the reactor, whereafter polymerization was conducted at 70° C. under a pressure of 32 bar G for 1 hour. The temperature was raised to 70° C. over a period of 20 minutes. The Al/Ti and Al/ED molar ratios in the polymerization were respectively 499 and 20.

After the polymerization, unreacted propylene was removed and the solid polymer was recovered. The activity of the catalyst system was 29.8 kg/g procatalyst. According to an n-heptane extraction test, the isotacticity index was 97.0% by weight. The $MFR_{2.16}$ of the polymer was 8.0 g/10 min. The polymer contained 0.5% by weight particles having a size smaller than 0.5 mm.

Example 2

690 μl of TEA was added to 50 μl of CHMMS in 10 ml of n-heptane at room temperature. Thereafter the mixture of TEA and silane was transferred into the reactor.

1720 μl of TEA was mixed with 503 μl of CHMMS. Thereafter the mixture of TEA and CHMMS was added to 25.70 g of a procatalyst slurry (containing 5.0 mg of dry procatalyst) at room temperature. 106.3 mg of the TEA, CHMMS and procatalyst mixture, containing 19.25 mg of dry procatalyst, was transferred into the reactor by using 10 ml of n-heptane.

Polymerization was carried out in the same conditions as in Example 1. The activity of the catalyst system was 25.4 kg/g procatalyst. The I.I. was 96.3% by weight. The $MFR_{2.16}$ was 8.2 g/10 min. The polymer contained 2.4% by weight particles having a size smaller than 0.5 mm.

Example 3 (comparative)

464 μl of TEA was added to 3.4 μl of CHMMS in 10 ml of n-heptane at room temperature. Thereafter the mixture of TEA and CHMMS was transferred into the reactor.

5540 μl of TEA was mixed with 2340 μl of CHMMS (50% by volume, diluted in n-heptane). Thereafter the mixture of TEA and CHMMS was added to 2.56 g of a procatalyst slurry (containing 0.5 g of dry procatalyst) at room temperature. 363.3 mg of the TEA, CHMMS and procatalyst mixture, containing 19.95 mg of dry procatalyst, was transferred into the reactor by using 10 ml of n-heptane.

Polymerization was carried out in the same conditions as in Example 1. The activity of the catalyst system was 15.9 kg/g procatalyst. The I.I. was 96.5% by weight. The $MFR_{2.16}$ was 7.5 g/10 min. The polymer contained 11.6% by weight particles having a size smaller than 0.5 mm.

Example 4 (comparative)

431 μl of TEA was mixed with 36 μl of dicyclopentyl dimethoxy silane (DCPDMS) in 25 ml of n-heptane at room temperature. The mixture of TEA and silane was transferred into the reactor.

258 μl of TEA was mixed with 22 μl of DCPDMS in 15 ml of n-heptane. Thereafter the mixture of TEA and DCP-DMS was added to a 20.1 mg portion of procatalyst. Thereafter the mixture of TEA, DCPDMS and procatalyst was transferred into a 5-liter stainless steel autoclave. Activation by precontacting was also carried out at room temperature. Thereafter this mixture was also transferred into the reactor.

After the adding of 1500 g of liquefied propylene and 71 mmol of hydrogen into the reactor at 20° C., polymerization was conducted at 70° C. under a pressure of 32 bar G for 1 hour. The temperature was raised to 70° C. over a period of 20 minutes. The Al/Ti and Al/ED molar ratios were respectively 500 and 20.

After the polymerization, unreacted propylene was removed and the solid polymer was recovered. The activity of the catalyst system was 29.0 kg/g procatalyst. According to an n-heptane extraction test, the I.I. was 98.3% by weight. The $MFR_{2.16}$ of the polymer obtained was 2.0 g/10 min. The polymer contained 0.3% by weight particles having a size smaller than 0.5 mm.

Example 5

686 μl of TEA was added to 58 μl of DCPDMS in 10 ml of n-heptane at room temperature. Thereafter the mixture of TEA and silane was transferred into the reactor.

1029 μl of TEA was mixed with 580 μl of DCPDMS. Thereafter the mixture of TEA and DCPDMS was added to 25.72 g of a procatalyst slurry (containing 5.0 g of dry procatalyst) at room temperature. 108.3 mg of the TEA, DCPDMS and procatalyst mixture, containing 19.95 mg of dry procatalyst, was transferred into the reactor by using 10 ml of n-heptane.

Polymerization was carried out in the same conditions as in Example 4. The activity of the catalyst system was 27.3 kg/g procatalyst. The I.I. was 98.3% by weight. The $MFR_{2.16}$ was 2.1 g/10 min. The polymer contained 0.6% by weight particles having a size smaller than 0.5 mm (diameter).

Example 6 (comparative)

464 μl of TEA was added to 13.4 μl of DCPDMS in 10 ml of n-heptane at room temperature. Thereafter the mixture of TEA and DCPDMS was transferred into the reactor.

5540 μl of TEA was mixed with 2230 μl of DCPDMS (50% by volume, diluted in n-heptane). Thereafter the mixture of TEA and DCPDMS was added to 2.572 g of a procatalyst slurry (containing 0.5 g of dry procatalyst) at room temperature. 362.1 mg of the TEA, DCPDMS and procatalyst mixture, containing 20 mg of dry procatalyst, was transferred into the reactor by using 10 ml of n-heptane.

Polymerization was carried out in the same conditions as in Example 4. The activity of the catalyst system was 13.8 kg/g procatalyst. The I.I. was 97.9% by weight. The $MFR_{2.16}$ was 2.3 g/10 min. The polymer contained 16.9% by weight particles having a size smaller than 0.5 mm.

Example 7 (comparative)

431 μl of TEA was mixed with 36 μl of 2-ethyl-1,1-dimethoxy hexane (EDMH) in 25 ml of n-heptane at room temperature. The mixture of TEA and EDMH was transferred into the reactor.

258 μl of TEA was mixed with 22 μl of EDMH in 15 ml of n-heptane. Thereafter the mixture of TEA and EDMH was added to 20.1 mg of procatalyst. Thereafter the mixture of TEA, EDMH and procatalyst was transferred into a 5-liter stainless steel autoclave. Activation of procatalyst by pre-contacting was also carried out at room temperature. Thereafter the precontact product was transferred into the reactor.

After the adding of 1500 g of liquefied propylene and 71 mmol of hydrogen into the reactor at 20° C., polymerization was conducted at 70° C. under a pressure of 32 bar G for 1 hour. The temperature was raised to 70° C. over a period of 20 minutes. The Al/Ti and Al/ED molar ratios in the polymerization were respectively 500 and 16.7.

After the polymerization, unreacted propylene was removed and the solid polymer was recovered. The activity of the catalyst system was 30.8 kg/g procatalyst. According to an n-heptane extraction test, the I.I. was 89.9% by weight.

The $MFR_{2.16}$ was 28.6 g/10 min. The polymer contained 0.4% by weight particles having a size smaller than 0.5 mm.

Example 8

690 μl of TEA was added to 60 μl of EDMH in 10 ml of n-heptane at room temperature. Thereafter the mixture of TEA and EDMH was transferred into the reactor.

1715 μl of TEA was mixed with 513 μl of EDMH. Thereafter the mixture of TEA and EDMH was added to 25.70 g of a procatalyst slurry (containing 5.0 g of dry procatalyst) at room temperature. 110.3 mg of the TEA, EDMH and procatalyst mixture, containing 20 mg of dry procatalyst, was transferred into the reactor by using 10 ml of n-heptane.

Polymerization was carried out in the same conditions as in Example 7. The activity of the catalyst system was 27.3 kg/g procatalyst. The I.I. was 89.6% by weight. The $MFR_{2.16}$ was 28.3 g/10 min. The polymer contained 3.2% by weight particles having a size smaller than 0.5 mm.

Example 9 (comparative)

464 μl of TEA was added to 6.4 μl of EDMH in 10 ml of n-heptane at room temperature. Thereafter the mixture of TEA and EDMH was transferred into the reactor.

5540 μl of TEA was mixed with 2594 μl of EDMH (50% by volume, diluted in n-heptane). Thereafter the mixture of TEA and EDMH was added to 2.57 g of a procatalyst slurry (containing 0.5 g of dry procatalyst) at room temperature. 367 milligrams of the TEA, EDMH and procatalyst mixture, containing 19.85 mg of dry (calculated as dry) procatalyst, was transferred into the reactor by using 10 ml of n-heptane.

Polymerization was carried out in the same conditions as in Example 7. The activity of the catalyst system was 14.7 kg/g procatalyst. The I.I. was 84.3% by weight. The $MFR_{2.16}$ was 32.9 g/10 min. The polymer contained 13.5% by weight particles having a size smaller than 0.5 mm.

TABLE 1

Polymerization conditions and results

| Example | Act. kg/g cat | I.I. % | MFR $g/10^{2.16}$ | Fines < 0.5 mm | Fines < 1 mm | TEA* μl | External donor* μl | Cat. mg |
|---|---|---|---|---|---|---|---|---|
| Donor CHMMS | | | | | | | | |
| 1 | 29.8 | 97.0 | 8.0 | 0.5 | 3.3 | 693 (260 + 443) | 51 (19 + 32) | 20.20 |
| 2 | 25.4 | 96.3 | 8.2 | 2.4 | 10.8 | 697 (7 + 690) | 52 (2 + 50) | 19.25 |
| 3 Comp. | 15.9 | 96.5 | 7.5 | 11.6 | 41.6 | 685 (221 + 464) | 50 (46.8 + 3.4) | 19.95 |
| Donor DCPDMS | | | | | | | | |
| 4 | 29.0 | 98.3 | 2.0 | 0.3 | 2.9 | 689 (258 + 431) | 58 (22 + 36) | 20.10 |
| 5 | 27.3 | 98.3 | 2.1 | 0.6 | 4.7 | 690 (4.1 + 686) | 60 (2.3 + 58) | 19.95 |
| 6 Comp. | 13.8 | 97.9 | 2.3 | 16.9 | 46.7 | 685 (221 + 464) | 58 (44.6 ± 13.4) | 20.00 |
| Donor EDMH | | | | | | | | |
| 7 | 30.8 | 89.9 | 28.6 | 0.4 | 3.1 | 689 (258 + 431) | 58 (22 + 36) | 20.10 |
| 8 | 27.3 | 89.6 | 28.3 | 3.2 | 12.1 | 697 (6.9 + 690) | 62 (2 + 60) | 20.00 |
| 9 Comp. | 14.7 | 84.3 | 32.9 | 13.5 | 43.6 | 684 (220 + 464) | 58 (51.5 + 6.4) | 19.85 |

Polymerization time was 1 hour.
*Total volumes used in the polymerizations

TABLE 2

Concentrations in the precontacting, i.e. activation step

| Example | [Ti] mol/dm³ | [TEA] mol/dm³ | [ED] mol/dm³ | Al/Ti mol/mol | Al/ED mol/mol |
|---|---|---|---|---|---|
| 1 | $0.068 \times 10^{-2}$ | 0.1265 | $0.063 \times 10^{-1}$ | 187 | 20.0 |
| 2 | $8.135 \times 10^{-2}$ | 0.4082 | $0.816 \times 10^{-1}$ | 5 | 5 |
| 3 Comp. | $2.328 \times 10^{-2}$ | 3.7708 | $5.442 \times 10^{-1}$ | 162 | 6.9 |
| 4 | $0.067 \times 10^{-2}$ | 0.1259 | $0.063 \times 10^{-1}$ | 187 | 20.0 |
| 5 | $8.302 \times 10^{-2}$ | 0.2490 | $0.830 \times 10^{-1}$ | 3 | 3 |
| 6 Comp. | $2.357 \times 10^{-2}$ | 3.8067 | $4.531 \times 10^{-1}$ | 161 | 8.4 |
| 7 | $0.067 \times 10^{-2}$ | 0.1259 | $0.076 \times 10^{-1}$ | 187 | 16.7 |
| 8 | $8.134 \times 10^{-2}$ | 0.4069 | $0.860 \times 10^{-1}$ | 5 | 4.7 |
| 9 Comp. | $2.280 \times 10^{-2}$ | 3.6810 | $6.088 \times 10^{-1}$ | 161 | 6 |

TABLE 3

Concentrations in polymerizations

| Example | [Ti] mol/dm³ | [TEA] mol/dm³ | [ED] mol/dm³ | Al/Ti mol/mol | Al/ED mol/mol |
|---|---|---|---|---|---|
| 1 | $2.72 \times 10^{-6}$ | $1.36 \times 10^{-3}$ | $6.78 \times 10^{-5}$ | 499 | 20.0 |
| 2 | $2.58 \times 10^{-6}$ | $1.36 \times 10^{-3}$ | $6.95 \times 10^{-5}$ | 528 | 19.6 |
| 3 Comp. | $2.68 \times 10^{-6}$ | $1.34 \times 10^{-3}$ | $6.71 \times 10^{-5}$ | 501 | 20.0 |
| 4 | $2.70 \times 10^{-6}$ | $1.35 \times 10^{-3}$ | $6.75 \times 10^{-5}$ | 500 | 20.0 |

TABLE 3-continued

Concentrations in polymerizations

| Example | [Ti] mol/dm$^3$ | [TEA] mol/dm$^3$ | [ED] mol/dm$^3$ | Al/Ti mol/mol | Al/ED mol/mol |
|---|---|---|---|---|---|
| 5 | 2.68 × 10$^{-6}$ | 1.35 × 10$^{-3}$ | 6.98 × 10$^{-5}$ | 504 | 19.3 |
| 6 Comp. | 2.69 × 10$^{-6}$ | 1.34 × 10$^{-3}$ | 6.71 × 10$^{-5}$ | 500 | 20.0 |
| 7 | 2.70 × 10$^{-6}$ | 1.35 × 10$^{-3}$ | 8.10 × 10$^{-5}$ | 500 | 16.7 |
| 8 | 2.68 × 10$^{-6}$ | 1.36 × 10$^{-3}$ | 8.59 × 10$^{-5}$ | 508 | 15.9 |
| 9 Comp. | 2.67 × 10$^{-6}$ | 1.34 × 10$^{-3}$ | 8.01 × 10$^{-5}$ | 502 | 16.7 |

I claim:

1. A process for olefin polymerization, comprising the steps of:
   a) providing:
      i) one or more polymerizable olefins having the general formula $CH_2=CR_1R_2$, wherein $R_1$ is selected from the group consisting of hydrogen and a $C_1$–$C_{10}$ alkyl, and $R_2$ is selected from the group consisting of hydrogen and a $C_1$–$C_{10}$ alkyl,
      ii) a procatalyst comprising titanium, chlorine and magnesium, and
      iii) a first amount and a second amount of cocatalyst, wherein said first amount and said second amount of cocatalyst comprise aluminum and a $C_1$–$C_{10}$ alkyl;
   b) contacting said first amount of said cocatalyst with said procatalyst wherein said first amount of cocatalyst has a concentration of between 0.001 and 2.0 mol/dm$^3$, to produce a first precontact product;
   c) contacting said first precontact product with said second amount of cocatalyst and said one or more polymerizable olefins to produce a first polymerized product.

2. The process according to claim 1, further comprising the step of recovering said first polymerized product.

3. The process of claim 1, wherein said first polymerized product is homopolymerized or copolymerized.

4. The process according to claim 1, wherein said step b) further comprises the step of contacting said first amount of cocatalyst with said procatalyst under conditions such that the molar ratio of aluminum to titanium is within a range of between 0.5 and 16.

5. The process according to claim 1, wherein said step b) further comprises the step of contacting said first amount of said cocatalyst with said procatalyst at a temperature between about −50° C. and 100° C.

6. The process according to claim 1, wherein said step b) further comprises the step of contacting said first amount of said cocatalyst with said procatalyst within a range of about 10 seconds to 5 hours.

7. The process according to claim 1, further providing a $C_6$–$C_{12}$ hydrocarbon solvent, and wherein step b) comprises the step of contacting said first amount of said cocatalyst with said procatalyst in said hydrocarbon solvent.

8. The process according to claim 1, wherein said step c) further comprises the step of contacting said first precontact product with said second amount of cocatalyst and said one or more polymerizable olefins under conditions such that the molar ratio of aluminum to titanium is within a range of about 50–1500.

9. The process according to claim 1, wherein said step c) further comprises the step of introducing hydrogen gas.

10. The process according to claim 1, wherein said one or more polymerizable olefins is propylene.

11. The process according to claim 1, wherein said procatalyst is coated with a prepolymer.

12. The process according to claim 1, wherein said procatalyst comprises a titanium compound having at least one titanium-halide bond supported on a magnesium halide.

13. The process according to claim 1, wherein said first amount of cocatalyst is in the form of a solution having a cocatalyst concentration within a range of about 0.001–1.0 mol/dm$^3$.

14. The process according to claim 1, wherein said first amount of cocatalyst comprises about 0.1–30% by weight of the combined weight of said first amount and said second amount of cocatalyst.

15. The process according to claim 1, wherein said first amount and said second amount of cocatalyst comprise a tri-$C_1$–$C_{10}$-alkyl aluminum.

16. The process according to claim 1, further providing a first amount and a second amount of an external electron donor, and wherein step b) further comprises the step of contacting said first amount of external electron donor with said first amount of cocatalyst and said procatalyst to produce a second precontact product, under conditions such that the molar ratio of aluminum to said external electron donor is within a range of about 0.5–100, and wherein step c) further comprises the step of contacting said second precontact product with said second amount of cocatalyst, said second amount of external electron donor, and said one or more polymerizable olefins, to produce a second polymerization product.

17. The process according to claim 16, further comprising the step of recovering said second polymerization product.

18. The process according to claim 16, wherein said second polymerization product is homopolymerized or copolymerized.

19. The process according to claim 16, wherein said molar ratio of aluminum to said external electron donor is within a range of about 1.0–50.

20. The process according to claim 16, wherein said first amount of said external electron donor has a concentration within a range of about 0.0002–0.4 mol/dm$^3$.

21. The process according to claim 20, wherein said first amount of said external electron donor has a concentration within a range of about 0.01–0.1 mol/dm$^3$.

22. The process according to claim 16, wherein said external electron donor comprises an alkoxysilane.

23. The process according to claim 22, wherein said alkoxysilane is selected from the group consisting of dialkyl dialkoxysilane, cyclohexyl methyl dimethoxysilane, and dicyclopentyl dimethyoxysilane.

24. The process according to claim 16, further comprising the steps of:
   d) providing a third amount of cocatalyst and a third amount of external electron donor;
   e) contacting said third amount of cocatalyst and said third amount of external electron donor with said one or more polymerizable olefins to produce a third polymerized product; and
   f) recovering said third polymerized product.

25. The process according to claim 24, wherein said third polymerized product is homopolymerized or copolymerized.

26. The process according to claim 24, wherein said step e) further comprises the step of contacting said third amount of cocatalyst with said one or more polymerizable olefins under conditions such that the molar ratio of aluminum to titanium is within a range of about 50–1500.

27. The process according to claim 24, wherein said step e) further comprises the step of introducing hydrogen gas.

28. The process according to claim 1, further comprising the steps of:

d) providing a third amount of cocatalyst;

e) contacting said third amount of cocatalyst with said one or more polymerizable olefins to produce a second polymerized product; and f) recovering said second polymerized product.

29. The process according to claim 28, wherein said second polymerized product is homopolymerized or copolymerized.

30. The process according to claim 28, wherein said step e) further comprises the step of contacting said third amount of cocatalyst with said one or more polymerizable olefins under conditions such that the molar ratio of aluminum to titanium is within a range of about 50–1500.

31. The process according to claim 28, wherein said step e) further comprises the step of introducing hydrogen gas.

32. The process according to claim 1, wherein said first amount and said second amount of cocatalyst comprise the same cocatalyst.

33. A method for using a catalyst component for olefin polymerization, comprising the steps of:

a) providing:

i) at least one polymerizable olefin, and ii) a catalyst, wherein said catalyst is produced by contacting a procatalyst comprising titanium, chlorine and magnesium, and a first amount of cocatalyst comprising aluminum and a $C_1$–$C_{10}$ alkyl, wherein said first amount of cocatalyst has a concentration of between 0.001 and 2.0 $mol/dm^3$, and b) contacting said catalyst with a second amount of cocatalyst and said at least one polymerizable olefin to produce a polymerized product.

* * * * *

UNITED STATES PATENT AND TRADEMARK OFFICE
CERTIFICATE OF CORRECTION

PATENT NO. : 6,043,324
DATED : 03/28/00
INVENTOR(S) : Amir K. Karbasi

It is certified that error appears in the above-identified patent and that said Letters Patent is hereby corrected as shown below:

In column 7, line 23, please delete "nitrites" and insert --nitriles--.

Signed and Sealed this

Twenty-seventh Day of February, 2001

Attest:

NICHOLAS P. GODICI

Attesting Officer     Acting Director of the United States Patent and Trademark Office